Feb. 5, 1957 W. H. BERCH 2,780,676

CORD CIRCUITS

Filed Aug. 2, 1954 8 Sheets-Sheet 1

INVENTOR.
WILLIAM H. BERCH

BY T. L. Bowes
ATTORNEY

Feb. 5, 1957 W. H. BERCH 2,780,676

CORD CIRCUITS

Filed Aug. 2, 1954 8 Sheets-Sheet 2

Feb. 5, 1957 W. H. BERCH 2,780,676

CORD CIRCUITS

Filed Aug. 2, 1954 8 Sheets-Sheet 4

Feb. 5, 1957 W. H. BERCH 2,780,676

CORD CIRCUITS

Filed Aug. 2, 1954 8 Sheets-Sheet 5

Feb. 5, 1957 W. H. BERCH 2,780,676

CORD CIRCUITS

Filed Aug. 2, 1954 8 Sheets-Sheet 6

2,780,676

CORD CIRCUITS

William H. Berch, Penfield, N. Y., assignor, by mesne assignments to General Dynamics Corporation, a corporation of Delaware Application August 2, 1954, Serial No. 447,157

6 Claims. (Cl. 179—51)

This invention relates to telephone circuits and more particularly to cord circuits for use in telephone systems.

It is an object of my invention to provide a new and improved cord circuit which will restrict service to or from certain lines.

The object of my invention is accomplished by providing means for opening the talking conductors at the cord circuit in order to prevent conversation on restricted service calls. In one embodiment of my invention I contemplate the use of marginal sleeve relays on both front and rear cords arranged to open the tip and ring conductors when both relays operate. A second embodiment of my invention contemplates the use of a lock-out relay for opening the tip and ring conductors in response to the failure of the conventional rear bridge relay to operate within a predetermined time of the connection of the cord circuit to the restricted line.

Figure 2:
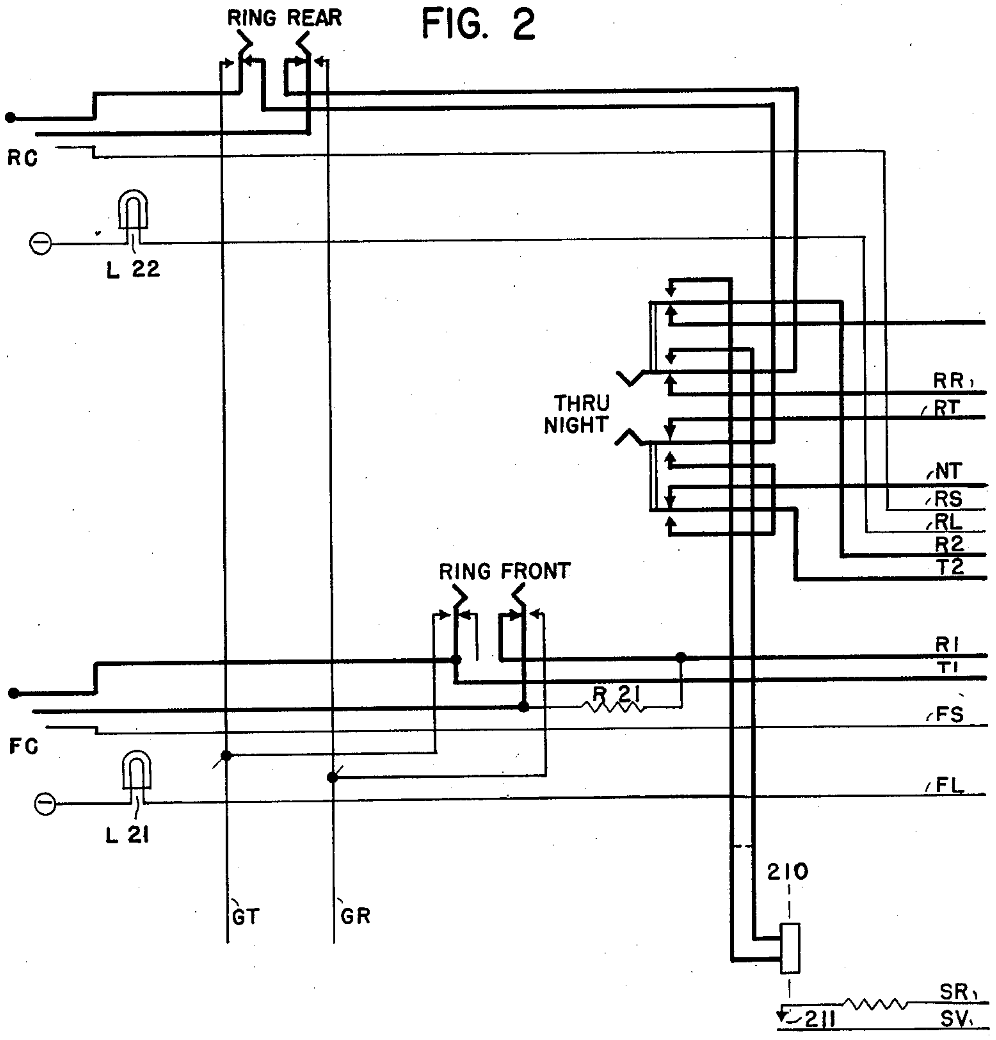
Figure 3:
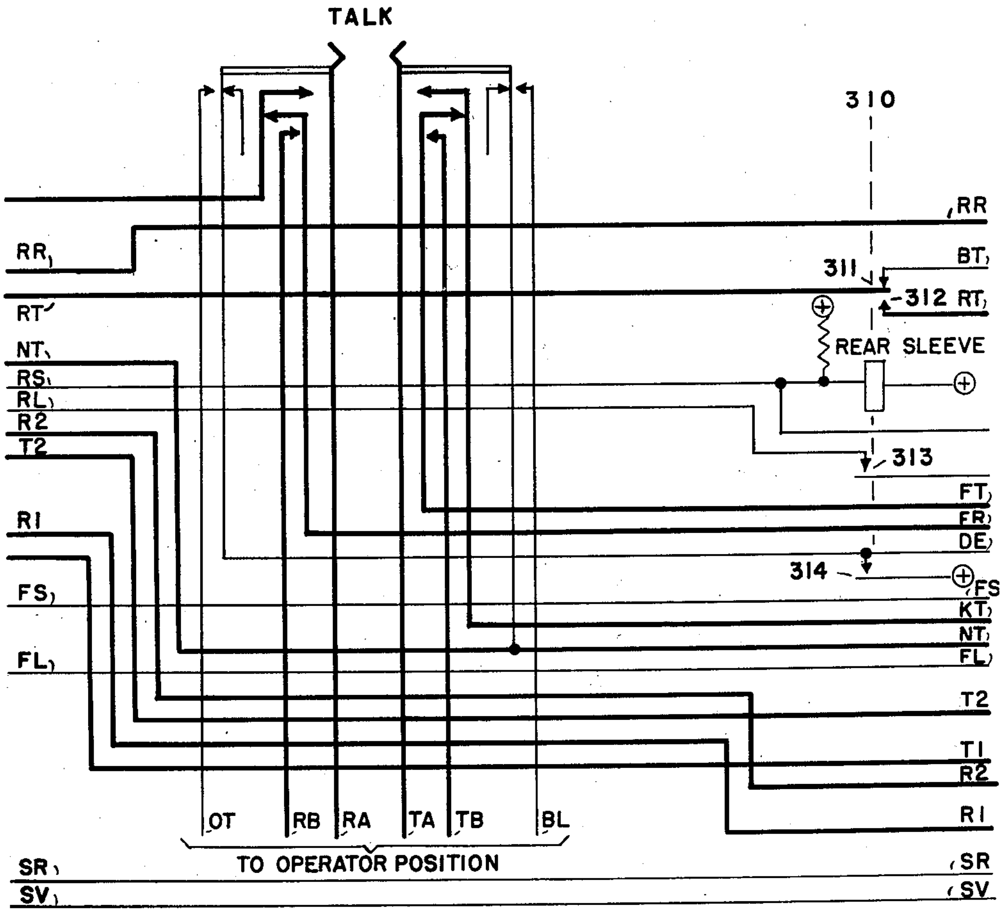
Figure 4:
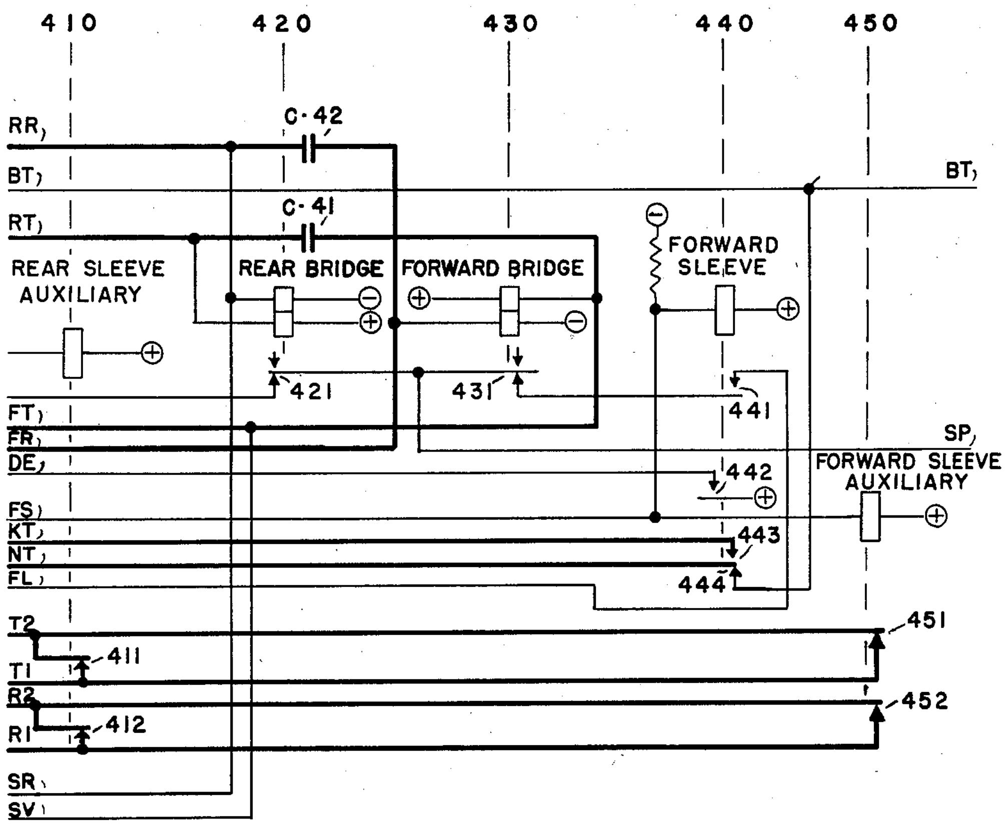
Figure 5:
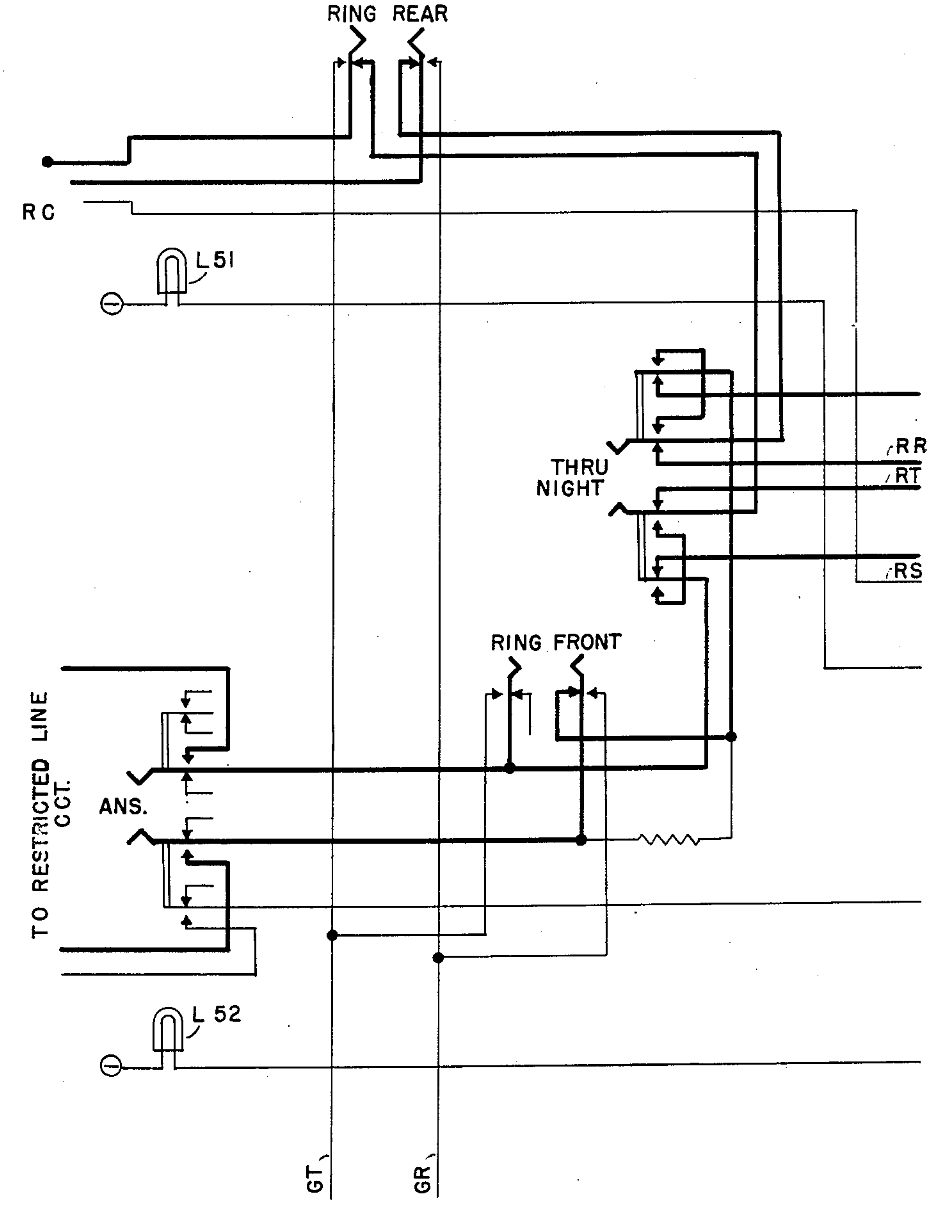
Figure 6:
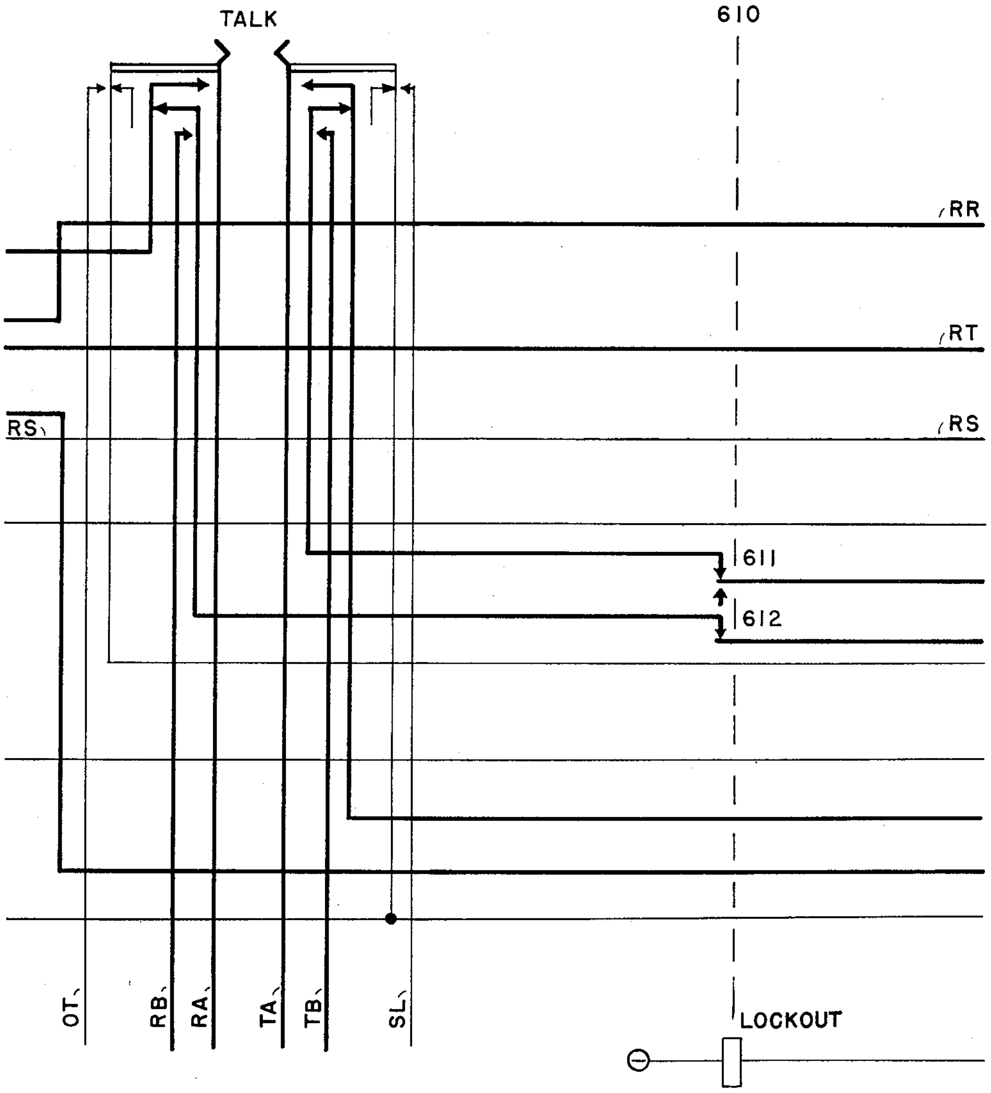
Figure 7:
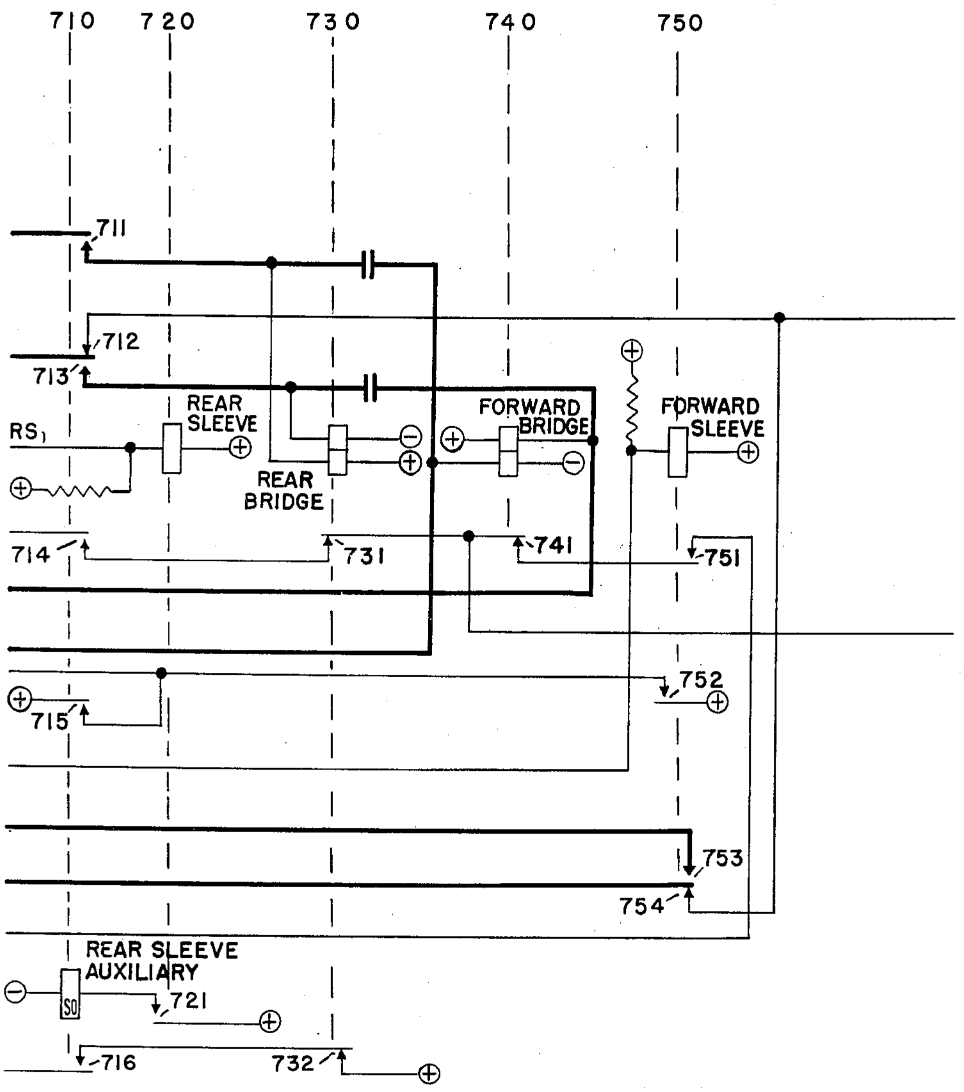
Figure 8A:
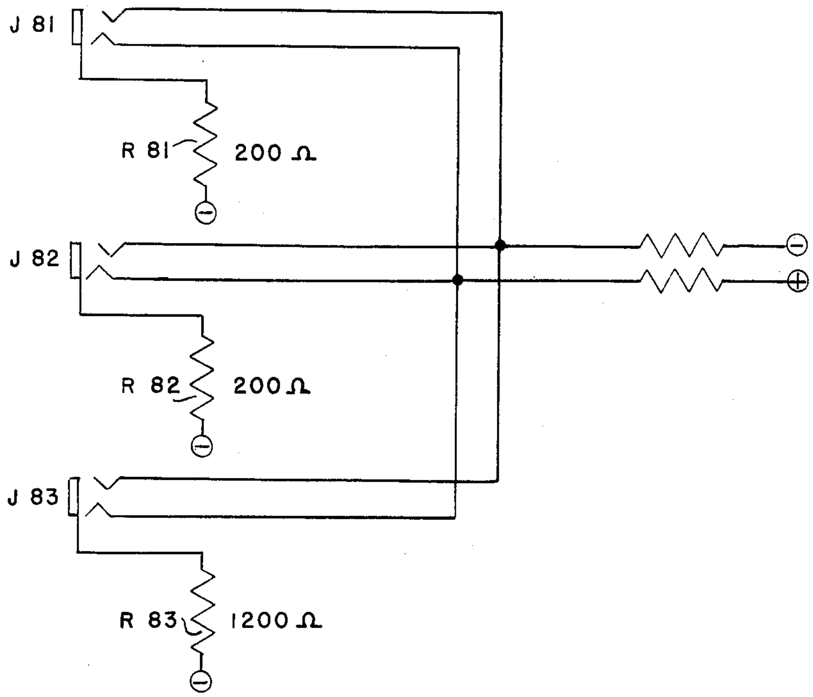
Figure 8B:
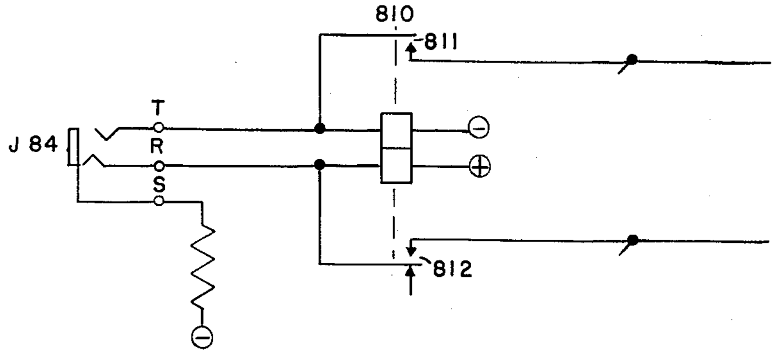

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which Fig. 1 is a block diagram of portions of a telephone system embodying the principles of my invention;

Figs. 2 to 4, inclusive illustrate the details of a cord circuit embodying one embodiment of my invention;

Figs. 5 to 7, inclusive illustrate circuit details of a cord circuit embodying a second embodiment of my invention, and Figs. 8A and 8B illustrate methods of applying restricted service provisions in connection with conference calls.

Figure 1:
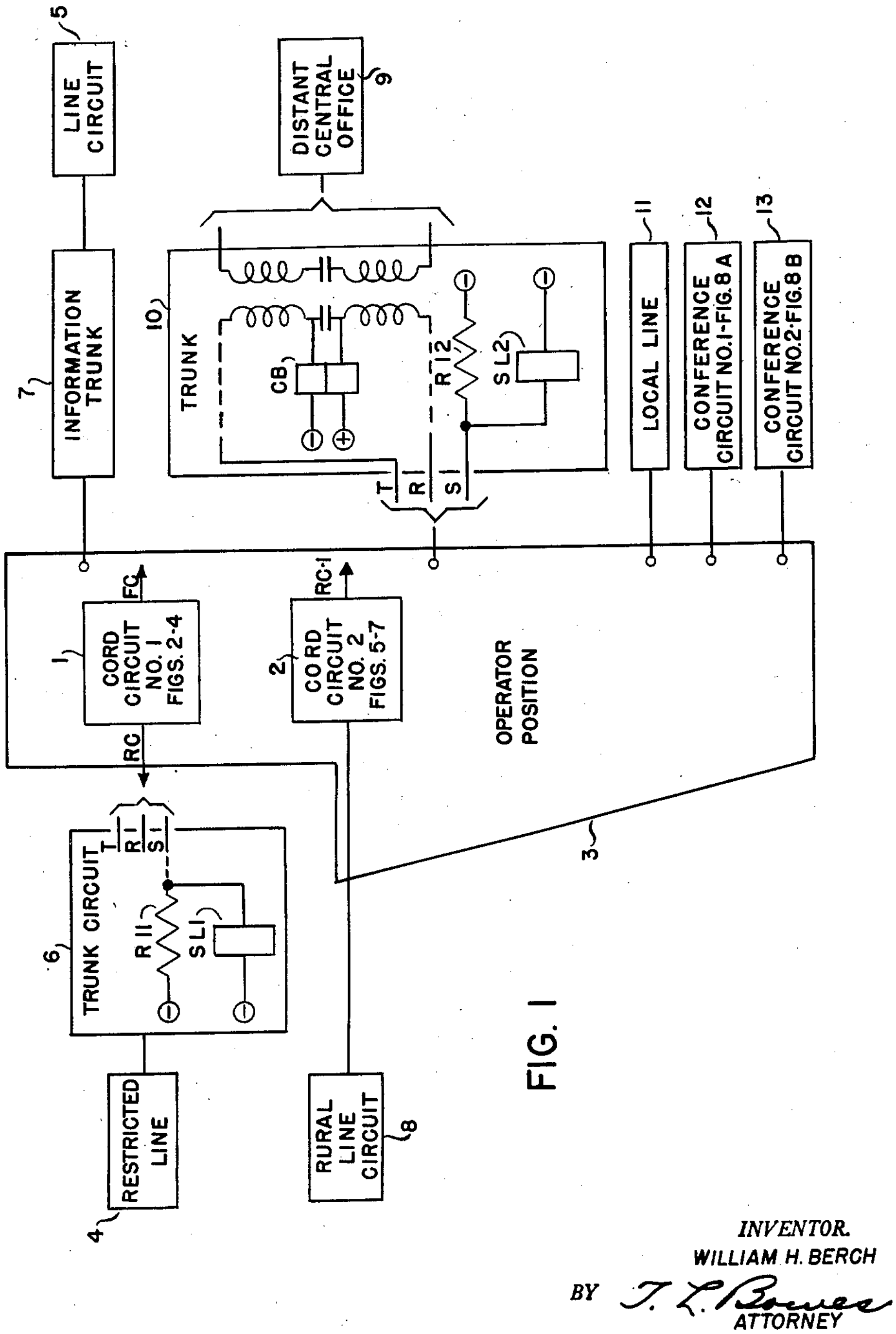

Referring to Fig. 1, there is illustrated in block diagram form a system including cord circuits 1 and 2 at operator position 3. Cord circuit 1 is shown in detail in Figs. 2 to 4, inclusive, has a rear cord RC and a front cord FC. Cord circuit 2 is provided with rear cord RC–1. Cord circuit 1 may be employed to extend calls between a restricted line 4 and a line circuit 5 as by way of trunk circuit 6 and information trunk 7, for example. Cord circuit 2 may be employed to extend calls between rural line circuit 8 and a distant central office 9 as by way of trunk 10, for example. The cord circuits may also be used in connection with local line 11 or conference circuits 12 and 13. The remaining figures of the drawings illustrate means for restricting lines 4 and 8 under certain circumstances.

The embodiment of my invention disclosed in Figs. 2, 3 and 4 is next described in detail. Let it be assumed that a calling condition exists at the operator's position on a call from line 4. When the operator inserts rear cord RC into the calling jack, battery on the cord sleeve conductor operates rear sleeve relay 310 over an obvious circuit.

In response to the operation of rear sleeve relay 310, assuming that the talk and ring rear keys are in their normal positions, a loop circuit is completed through contacts 312 and normal contacts of the through night and ring rear keys for energizing rear bridge relay 420. The circuit for the upper winding of relay 420 is from battery through the upper winding of relay 420, conductor RR, normal through night key contacts and normal ring rear key contacts to the ring side of the rear cord. The circuit for the lower winding of relay 420 extends from ground through the lower winding, operated contacts 312, tip conductor RT, normal contacts of the through night key, and normal contacts of the ring rear key to the tip conductor of the rear cord. Of course, the calling loop completes the circuit.

The operation of relay 310 also effects the application of ground through contacts 314 to conductor DE.

Also in response to the operation of relay 310, a circuit is completed for illuminating rear supervisory lamp L22 from battery through lamp L22, conductor RL, operated contacts 313, and normal contacts 421 to ground on lead SP.

In response to the operation of relay 420 lamp L22 is extinguished upon the opening of contacts 421.

The operator may now operate the talk key and upon operation of the talk key may converse with the calling party over the loop extending from the tip conductor of the rear cord through normal contacts of the ring rear key, normal contacts of the through night key, conductor RT, operated contacts 312, capacitor C41, conductor FT, operated contacts of the talk key to the operator position circuit by way of conductor TB. The return circuit from the operator position circuit comprises conductor RB, operated contacts of the talk key, conductor FR, capacitor C42, conductor RR, and normal contacts of the through night and ring rear keys to the ring side of the rear cord.

After ascertaining the desired number, the operator may insert front cord FC into the desired line jack, thereby closing an obvious circuit from battery (not shown) on the sleeve conductor of the front cord to forward sleeve relay 440 by way of conductor FS.

In response to the operation of relay 440, an alternate ground is connected to conductor DE through operated contacts 442; a circuit is prepared at contacts 443 for extending the tip and ring conductors of the front cord to the operator's position circuit, the circuit extending from the tip side of the front cord through conductor T1, normal contacts 411 and 451 in parallel, conductor T2, normal contacts of the through night key, conductor NT, operated contacts 443, conductor KT, and operated contacts of the talk key to the position circuit by way of conductor TA. The return conductor from the position circuit, RA, is extended through make contacts of the talk key, normal contacts of the through night key, conductor R2, normal contacts 412 and 452 in parallel, conductor R1, normal contacts of the ring front key to the ring side of the front cord. The circuit now stands ready for dialing, if used, or the application of ringing current by means of the ring front key. The operation of relay 440 also results in the illumination of front supervisory lamp L21 through conductor FL, operated contacts 441, and normal contacts 431 to ground on lead SP.

When the called party answers, the front loop is completed in conventional fashion for operating forward bridge relay 430, the circuit extending from the front tip conductor by way of conductor T1, normal contacts 411 and 451 in parallel, conductor T2, normal contacts of the through night key, conductor NT, contacts 443, conductor KT, normal contacts of the talk key (which has now been released by the operator), conductor FT, and upper winding of relay 430 to ground. The lower winding of relay 430 is connected to battery at one terminal and the other terminal is connected to the ring side of the called line by way of conductor FR, normal contacts of the talk key, normal contacts of the through night key, conductor R2, contacts 412 and 452 in parallel, conductor R1, and normal contacts of the ring front key to the ring side of the front cord.

In response to the operation of relay 430, contacts 431 are opened to extinguish lamp L21, thereby giving answer supervision to the operator.

With the talk key in its normal position, a talking path has now been established over the tip and ring leads from the rear cord to the front cord. The circuit extends from the calling tip conductor through normal contacts of the ring rear key, conductor RT, operated contacts 312, capacitor 641, conductor FT, normal contacts of the talk key, conductor KT, operated contacts 443, conductor NT, normal contacts of the through night key, conductor T2, contacts 411 and 451 in parallel and conductor T1 to the front tip conductor. The ring side of the line is extended from the ring conductor of the rear cord through normal contacts of the ring rear key and through night key, conductor RR, capacitor C42, conductor FR, normal contacts of the talk key, normal contacts of the through night key, conductor RR, capacitor C42, conductor FR, normal contacts of the talk key, normal contacts of the through night key, conductor R2, contacts 412 and 452 in parallel, conductor R1, and normal contacts of the ring front key to the ring conductor of the front cord.

Conversation may now take place.

When the called party disconnects, the loop to forward bridge relay 430 is broken allowing relay 430 to restore, thereby connecting ground through operated contacts 441 to relight lamp L21 and giving disconnect supervision to the operator. When the calling party disconnects, the loop for rear bridge relay 420 is broken allowing that relay to release and connect ground to lamp L22 at normal contacts 421 in order to give disconect supervision to the operator.

To ring a line over either the front or rear cord, the desired frequency is selected in conventional manner and the ring front or ring rear key, as desired, is operated to connect the selected source of ringing current to leads GT and GR to the desired cord. Operation of the ring keys opens the cord tip and ring leads from the rest of the circuit and at the same time places generator shunt ground on the line through the operated ring key.

Ringback tone may be furnished to the calling party through a suitable resistor R21 connected as shown.

Through night service may be provided by plugging the front and rear cords into the desired jacks and with the through night key operated, the tip and ring leads of the front and rear cords are connected together, at the same time opening these leads from the rest of the circuit. The sleeve leads close the circuit to their respective sleeve relays 310 and 440 which in operation do not light the cord supervisory lamps as battery is removed from the board on night service.

When supervision is desired on through-dial service, the supervisory relay 210 is employed. With the arrangement shown, relay 210 is connected in series with the ring lead and is operated by battery at a suitable location, such as a central office through which the call is extended. When the through night key is operated, relay 210 operates to close a circuit through contacts 211 to operate bridge relays 420 and 430. When these relays operate, leads or conductors RL and FL are opened to extinguish the cord supervisory lamps. If supervision is not desired, the conductors extending to relay 210 may be joined as indicated by the dotted line and relay 210 may be omitted.

Means is provided for restricting the use of the cord circuits shown in Figs. 2, 3 and 4 in certain cases. For example, it may be desired to prevent an operator from forwarding calls from a certain trunk, as for example an incoming restricted line 4, to certain destinations as for example, a distant central office. Such a situation might arise when a toll charge should be made for such service.

In accordance with my invention, I have provided rear and forward sleeve auxiliary relays 410 and 450, respectively, which are connected to operate only when the connecting circuits, such as trunks, are marked for restriction. Referring to Fig. 4, relay 410 is connected in parallel with rear sleeve relay 310 and similarly, forward sleeve auxiliary relay 450 is connected in parallel with forward sleeve relay 440. The resistances of relays 410 and 450 are made high enough so that relay 310 shunts down relay 410 and relay 440 shunts down relay 450 unless the current flowing in conductors RS and FS is sufficiently high. For example, relays 310 and 440 may be of the order of 100 ohms and relays 410 and 450 may be of the order of 850 ohms.

The current flow through conductors RS and FS may be controlled by the insertion of suitable resistance at another point. For example, in the arrangement shown in this application, restrictive marking is provided by the amount of resistance in the sleeve leads of the cords. Referring to Fig. 1, I have connected resistance battery to the sleeve leads in trunk circuit 6. Where unrestricted service is desired, the resistance will have a relatively high value as, for example, of the order of 1200 ohms whereby for restricted service the resistance may be of the order of 200 ohms, for example. In the arrangement shown in Fig. 1, resistors R11 and R12 are shunted by relays S1–1 and SL–2, respectively, which may be sleeve relays. If each of these relays has a resistance of approximately 350–400 ohms and resistors R11 and R12 are approximately 400 ohms, the parallel resistance will be approximately 200 ohms. For unrestricted service, resistance values may be changed or a 1200 ohm relay may be used and resistors R11 and R12 omitted, for example.

Referring to Figs. 2, 3 and 4, on restricted service the current flowing in conductors RS and FS is sufficiently high to operate both relays 410 and 450. Hence, when the operator plugs a rear cord in response to a calling condition, resistance battery on the sleeve conductor operates both relays 310 and 410. When relay 410 operates, contacts 411 and 412 are opened. Similarly, when a front cord is plugged into a restricted trunk, resistance battery on the sleeve conductor FS operates relay 450 in parallel with relay 440. Upon the operation of relay 450, normal contacts 451 and 452 are opened. The opening of contacts 411, 412, 451 and 452 disconnects the conductor T1 from conductor T2 and conductor R1 from conductor R2 thereby opening the front tip and ring circuits. Obviously, the operator cannot extend a call over the front cord under these conditions.

A second embodiment of my invention is illustrated in Figs. 5, 6 and 7 wherein restriction is obtained by preventing rear bridge relay 730 from operating on restricted calls, and the failure of relay 730 to operate is utilized to effect the operation of a lockout relay after a predetermined time delay. The lockout relay is employed to open the tip and ring conductors.

In this embodiment of my invention, I have eliminated the front cord, the tip, ring and sleeve leads normally associated with the front cord being permanently connected to an answer switch ANS.

Assuming that a call is being made from a distant central office to a restricted line such as the rural line circuit 8 shown in Fig. 1, the operator inserts the rear cord end of the permanently connected cord into the jack representing the calling condition. Suitable means is provided to apply battery to the tip lead and ground to the ring lead as, for example, through the windings of a calling bridge relay CB in the trunk of Fig. 1. At the same time resistance battery is conected to the sleeve conductor in the manner described above.

When the rear cord plug RC is inserted into the calling jack, a circuit is completed for operating rear sleeve relay 720 over the sleeve conductor.

Responsive to the operation of relay 720, an obvious circuit is completed for operating rear sleeve auxiliary relay 710.

In response to the operation of relay 710, which is made slow-to-operate, the tip and ring conductors of the rear cord are connected to the lower and upper windings, respectively, of rear bridge relay 730. Under the conditions imposed, relay 730 cannot operate because the upper winding is connected to battery on both sides and both sides of the lower winding are connected to ground.

The lockout relay 610 is provided in order to open at contacts 611 and 612 the tip and ring conductors extending to the rural line. It is noted that the energizing circuit for relay 610 includes break contacts 732 of relay 730.

Let it now be assumed that an attempt is made to extend a call from the rural station to the distant office. Under these circumstances, forward sleeve relay 750 is operated from resistance battery on the sleeve lead and operated contacts on the answer key ANS to light supervisory lamp L52 through contacts 751. Forward bridge relay 740 is operated over the calling loop and operated contacts of the answer key, the circuit including operated contacts 753, thereby extinguishing lamp L52 at contacts 741.

When the operator plugs into the restricted trunk, the operation is the same as before, i. e., relays 720 and 710 operate but rear bridge relay 730 fails to operate and hence lockout relay 610 operates to open the tip and ring conductors FT and FR, respectively, at normal contacts 611 and 612.

Assuming that there is no restriction in the trunk, the rear cord battery and ground connections are reversed so that the proper potentials are available to operate rear bridge relay 730. The operation of relay 730 opens the energizing circuit for lockout relay 610 at contacts 732 thereby preventing the operation thereof. Accordingly, the tip and ring leads are extended through the cord circuit from the answer key to the rear cord. If it be assumed that the call coming in from the rural or otherwise restricted line is intended for a local line, the operator, of course, plugs the rear cord into a loop which completes a circuit over conductors RR and RT for operating relay 730.

In Fig. 8A, there are illustrated the base elements of a conference circuit designed for use with the cord circuit of Figs. 2 through 4. The sleeve terminals of jacks J81 and J82 representing restricted lines are connected to battery through relatively low-valued resistances R81 and R82, respectively, as, for example 200 ohms. The sleeve terminal of jack J83, representing an unrestricted party is connected to battery through relatively high-valued resistor R83, as, for example, 1200 ohms. In order to prevent the operation of auxiliary sleeve relays 410 and 450 and interruption of the tip and ring conductors, the operator must use jack J83 for one connection.

In Fig. 8B there are illustrated the basic elements of a conference circuit designed for use with the cord circuit of Figs. 5 through 7. If a restricted line is involved, battery on the tip lead and ground on the ring portion of the plug extends those potentials to the upper and lower windings of conference relay 810 in a manner shunting out both windings. Therefore relay 810 cannot operate. If no restriction is required, ground appears on the tip side and battery on the ring side of the plug and, accordingly, relay 810 is operated to close contacts 811 and 812 extending to the lines designated for conference use.

While I have shown and described a particular embodiment of my invention, it will be obvious to those skilled in the art that changes and modifications may be made without departing from my invention in its broader aspects. I therefore, aim in the appended claims to cover all such changes and modifications as fall within the true spirit and scope of my invention.

What I claim is:

1. A telephone system comprising an operator's position, a cord circuit at said operator's position, a distant office, a trunk circuit, a line terminating at said operator's position, means for enabling an operator at said position to extend a connection between said line and said distant office through said cord circuit and said trunk, said connection comprising a pair of talking conductors, a lock-out relay, said lock-out relay having a pair of normally closed contacts in at least one of said talking conductors, a rear bridge relay, means for operating said rear bridge relay on unrestricted calls, means for preventing operation of said rear bridge relay on restricted calls, and means responsive to the connection of said cord circuit to said trunk circuit for completing an operating circuit for said lockout relay only if said rear bridge relay is not operated, whereby said lockout relay operates on restricted calls to open the talking connection.

2. A telephone system comprising an operator's position, a cord circuit at said operator's position, a distant office, a trunk circuit, a line terminating at said operator's position, means for enabling an operator at said position to extend a connection between said line and said distant office through said cord circuit and said trunk, said connection comprising a pair of talking conductors and a sleeve conductor, said means comprising a rear sleeve relay, means for operating said rear sleeve relay in response to the connection of said cord circuit to said trunk, a slow to operate auxiliary relay, means responsive to the operation of said rear sleeve relay for operating said auxiliary relay, a lock-out relay, said lock-out relay having a pair of normally closed contacts in at least one of said talking conductors, said auxiliary relay having a pair of make contacts in at least one of said talking conductors, a rear bridge relay, means for operating said rear bridge relay on unrestricted calls, means for preventing operation of said rear bridge relay on restricted calls, and means responsive to the operation of said auxiliary relay for completing an operating circuit for said lockout relay only if said rear bridge relay is not operated, whereby said lockout relay operates on restricted calls to open the talking connection.

3. In a telephone system a calling line, a called line, a first trunk connected to said calling line, a second trunk connected to said called line, an operator's position, means at said operator's position for connecting said first trunk to said second trunk in order to complete a talking connection therebetween, said means including a cord circuit, said cord circuit comprising parallel connected rear sleeve and rear auxiliary relays and parallel connected forward sleeve and forward auxiliary relays, means for operating only said sleeve relays on unrestricted calls but for operating both sleeve relays and auxiliary relays on restricted calls, the connection between said trunks comprising a pair of talking conductors, each of said auxiliary relays having a pair of contacts, said pairs of contacts being connected in parallel in one of said talking conductors whereby at least said one talking conductor is opened in response to the operation of said auxiliary relays when said trunks are connected to lines marked for restricted service.

4. In a telephone system a calling line, a called line, a first trunk connected to said calling line, a second trunk connected to said called line, an operator's position, means at said operator's position for connecting said first trunk to said second trunk in order to complete a talking connection therebetween, said means including a cord circuit, said cord circuit comprising parallel connected rear sleeve and rear auxiliary relays and parallel connected forward sleeve and forward auxiliary relays, the resistance of said auxiliary relays being at least several times the resistance of said sleeve relays, a circuit for energizing said rear sleeve and auxiliary rear relays, said circuit including a source of potential and a resistance in said first trunk circuit, said circuit being completed upon connection by said operator of said cord circuit to said first trunk, a circuit for energizing said forward sleeve and auxiliary forward relays including a source of potential and a resistor in said second trunk, said last mentioned circuit being completed upon connection by said operator of said cord circuit to said second trunk, the value of resistance of said resistors being at least several times larger for unrestricted line service than for restricted service, the values of resistance of said relays being so chosen that on restricted calls said auxiliary relays operate in parallel with said sleeve relays but on unrestricted calls only said sleeve relays operate, the connection between said trunks comprising a pair of talking conductors, each of said auxiliary relays having a pair of contacts, said contacts being connected in parallel in one of said talking conductors whereby at least said one talking conductor is opened in response to the operation of said auxiliary relays when said trunks are connected to lines marked for restricted service.

5. In a telephone system, a calling line, a called trunk, an operator's position, means at said operator's position for connecting said calling line to said called trunk in order to complete a talking connection therebetween, said means including a cord circuit, said cord circuit comprising a marginal rear sleeve relay and a marginal front sleeve relay, means for operating said rear sleeve relay if the calling line is entitled to restricted service only, means for operating said front sleeve relay if the called trunk is restricted to restricted service lines, the connection between said calling line and said trunk comprising a pair of talking conductors, each of said marginal sleeve relays having a pair of contacts, said pairs of contacts being connected in parallel in one of said talking conductors, whereby at least one talking conductor is opened in response to the operation of said marginal sleeve relays when a restricted line calls a restricted trunk.

6. In a telephone system, an operator's position, first and second classes of calling lines terminating at said operator's position, first and second classes of trunks terminating at said operator's position, means at said operator's position for connecting a calling one of said lines to a selected one of said trunks in order to complete a talking connection therebetween, said means including a cord circuit, said cord circuit comprising a marginal rear sleeve relay and a marginal front sleeve relay and a pair of talking conductors, each of said marginal sleeve relays having a pair of contacts, said pairs of contacts being connected in parallel in one of said talking conductors, means responsive to the connection of said cord circuit to said calling line for operating said marginal rear sleeve relay only if the calling line is of said first class of lines, and means responsive to the connection of said cord circuit to the selected one of said trunks for operating said marginal front sleeve relay only if the selected trunk is of said first class of trunks, whereby at least one talking conductor is opened in response to the operation of said marginal relays when a line of said first class of lines is connected to a trunk of said first class of trunks.

References Cited in the file of this patent

UNITED STATES PATENTS

| | | |
|---|---|---|
| 1,376,391 | Arnold et al. | May 3, 1921 |
| 2,031,922 | Bonomi | Feb. 25, 1936 |